Jan. 26, 1971 R. ANDRES 3,558,168
MECHANISM FOR LOCKING A MOTOR VEHICLE DOOR LOCK
Filed Jan. 27, 1969
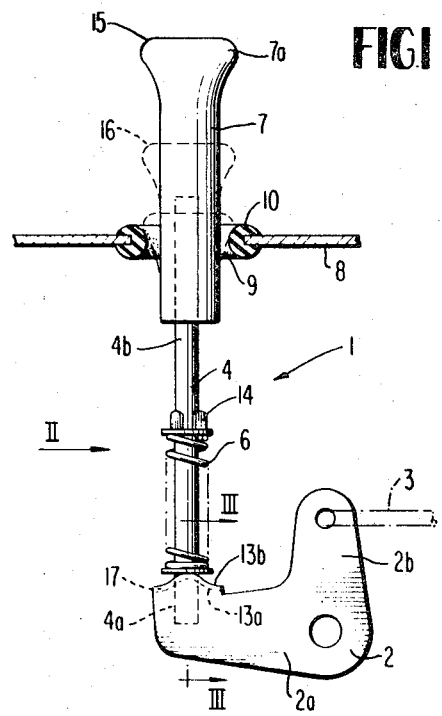
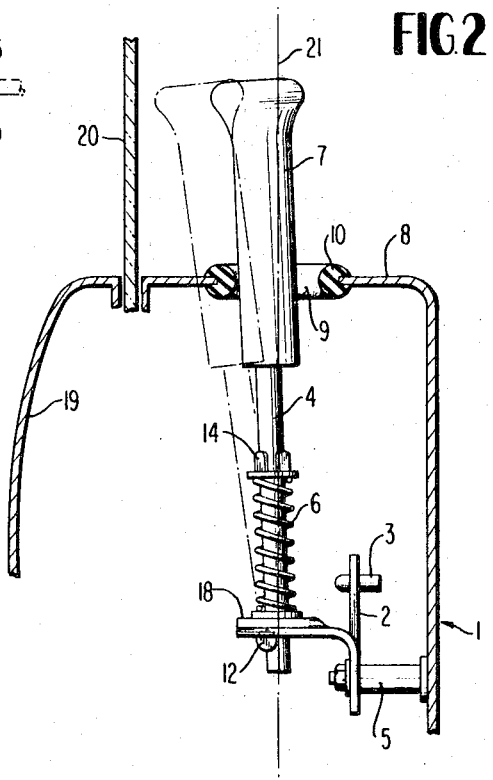
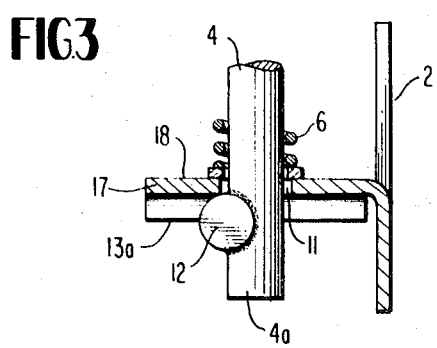
INVENTOR
RUDOLF ANDRES
BY *Craig d'Antonelli*
ATTORNEYS พ
United States Patent Office 3,558,168
Patented Jan. 26, 1971

3,558,168
MECHANISM FOR LOCKING A MOTOR VEHICLE DOOR LOCK
Rudolf Andres, Sindelfingen, Germany, assignor to Daimler-Benz Aktiengesellschaft, Stuttgart-Unterturkheim, Germany
Filed Jan. 27, 1969, Ser. No. 794,147
Claims priority, application Germany, Feb. 1, 1968, 1,653,962
Int. Cl. E05b 1/02
U.S. Cl. 292—347          15 Claims

ABSTRACT OF THE DISCLOSURE

An arrangement for securing the locked position of a motor vehicle door-lock which includes a locking rod that is connected on the inside of the door with a bellcrank, itself connected with the door-lock mechanism; the locking rod projects with its actuating knob through an aperture provided in the lower window frame and is adapted to be displaced into the locking position by pressure in the axial direction; in the pressure (push-in) direction the locking rod is yieldingly arranged with respect to the bellcrank by way of a pre-stressed spring but is rigidly arranged with respect to the bellcrank in the return (pulling) direction.

---

The present invention relates to a mechanism for securing the locked position of a motor vehicle doorlock, essentially consisting of a locking rod which is operatively connected within the door with a bellcrank connected with the lock mechanism, which together with an actuating knob mounted thereon and made from elastic material, projects freely through an aperture provided in the lower window frame and which can be brought by pressure in the axial direction into the locking position.

The locking rods of the prior art installations of this type together with the assembled actuating knobs are rigidly (non-yieldingly) pivoted at the bellcranks. With a possible impact, during accidents, on the actuating knobs projecting freely into the passenger space of a motor vehicle, the actuating knobs are thus unable to yield in the axial direction and therefore represent a particular source of danger.

In order to avoid the injury danger during an accident made possible by the non-yielding actuating knobs, elastic actuating knobs have already been proposed which are mounted over the locking rods with overlap and which are further displaceable over the rods in case of an impact. Unfavorable, however, with these prior art knobs is the temperature-dependent displacement force, and additionally of disadvantage is the fact that by reason of the slight overlap required for the absorption of sudden impact loads, they can be easily pressed or pulled by hand from their normal position.

According to the present invention, the aim to construct an accident-safe actuating knob is solved in that the locking rod is yieldingly arranged in the pressure direction with respect to the bellcrank by way of a prestressed spring, whereas it is rigidly arranged with respect to the bellcrank in the return direction. In an advantageous manner, the pre-stress force of the spring is thereby greater than the pressure force necessary for pushing in the locking rod into the locking position.

It is achieved by the arrangement in accordance with the present invention that with a usual actuation by the manual force, the actuating knob, when being pushed in from its unlocked position into the locking position, does not spring-deflect at all or spring-deflects only slightly, whereas during unlocking in the return direction it is rigid with respect to the bellcrank. However, it is assured that during an impact on the actuating knob, the knob is able to deflect in the axial direction beyond its locking position, and that after the termination of the impact load, it is able to return again automatically into its locking position.

The pre-stressed spring can thereby be clamped between the locking rod, which carries the actuating knob, and a connecting rod which is pivotally connected at the bellcrank. However, appropriately the locking rod which extends with play through a bore in a leg portion of the bellcrank and which is provided at its lower end with an abutment, abutting against the bottom side of the leg portion, is pivotally connected at the bellcrank, whereas the spring which is constructed as coil spring, is clamped between the top side of the leg portion and a shoulder or collar at the locking rod.

For reasons which will be described more fully hereinafter, it may be of advantage to provide the leg portion of the bellcrank with a convexly curved surface portion directed toward the coil spring on whose apex, disposed perpendicularly to the movement plane of the bellcrank, is supported the compression spring along a line-shaped contact.

The convexly curved surface can thereby be constructed as a corrugation embossed into one leg of the bellcrank into whose channel, pressed into the bottom side of the leg portion, engages the locking rod with its abutment. As a result of the locking action against rotation of the locking rod achieved thereby, an actuating knob which is threadably secured on the locking rod can be readily assembled and disassembled.

According to a further feature of the present invention, the abutment provided at the lower end of the locking rod is arranged one-sidely or unilaterally on the side of the end of the locking rod facing the outer wall of the door of the motor vehicle. It is achieved thereby that the stressed spring presses the locking rod obliquely out of the plane of movement of the bellcrank. The actuating knob, otherwise freely projecting into the interior space of the motor vehicle, is thereby urged or held at an inclination against the window retained within the window frame and therefore forms hardly an impact surface in the interest of the safety of the vehicle passengers. A further advantageous effect essentially resides in that the locking rod is pressed continuously by its forcibly inclined position against the aperture rim of the aperture provided in the lower window frame, and as a result thereof, a rattling is no longer possible by an impingement of the rod against the aperture rim.

Accordingly, it is an object of the present invention to provide an installation for a locking mechanism of a motor vehicle door which avoids by simple means the aforementionad shortcomings and drawbacks encountered in the prior art.

Another object of the present invention resides in an installation of the type described above which greatly reduces the danger of injury in case of impact.

A further object of the present invention resides in a locking rod for a door-lock which is able to yield in case of impact during accidents.

Still a further object of the present invention resides in a mechanism for locking of the locking position of a motor vehicle door-lock which is simple in construction yet readily achieves the aforementioned aims and objects without great expenditures.

Another object of the present invention resides in a locking mechanism for a door-lock of a motor vehicle which greatly minimizes the danger of rattle noises on the part of the locking knob.

These and further objects, features and advantages of the present invention will become more obvious from the following description when taken in connection with the accompanying drawing which shows, for the purposes of illustration only, one embodiment in accordance with the present invention, in wherein:

FIG. 1 is an elevational view from the interior space of the motor vehicle on an installation of the present invention arranged in a door of a motor vehicle for the locking of the locked position of the motor vehicle door-lock.

FIG. 2 is an elevational view, taken in the direction of arrow II of FIG. 1, and FIG. 3 is a cross-sectional view, on an enlarged scale, taken along line III—III of FIG. 1.

Referring now to the drawing wherein like reference numerals are used throughout the various views to designate like parts, reference numeral 1 generally designates the door of a motor vehicle; the mechanism in accordance with the present invention which is arranged within the door 1 consists of the bellcrank 2, of the linkage 3, and of the locking rod 4. The bellcrank 2 is rotatably supported on a pin 5 mounted at the door 1 of the motor vehicle; the linkage 3 is pivotally connected at the one leg portion 26 of the bellcrank 2 and is operatively connected in a conventional manner with the lock mechanism (not shown) at the door-lock; the locking rod 4 is pivotally connected at its lower end 4a with the aid of the pre-stressed coil spring 6 with the other inwardly-bent leg portion 2a of the bellcrank 2 and carries at its other end 4b the screwed-on actuating knob 7.

The actuating knob 7 made from elastic synthetic resinous material of any known type projects through the opening 9 provided in the lower window frame 8 which is surrounded with a ring 10 also made from elastic synthetic resinous material.

The pivot joint necessary between the locking rod 4 and the leg portion 2a is formed in that the locking rod 4 consisting of round steel bar stock, extends with its lower end 4a with a play through a bore 11 of the leg portion 2a and is provided at its lower end with an abutment 12 which is pressed by the coil spring 6 against the bottom side 13a of the leg portion 2a. The coil spring 6 itself is supported by way of washers, on the one hand, against a shoulder or rim 14 at the upper end 4b of the locking rod 4 and, on the other hand, against the top side 13b of the leg portion 2a.

In FIG. 1 the mechanism is illustrated in full lines in its unlocked position 15; by means of pressure in the axial direction the actuating knob 7 can be brought into its locking position 16, indicated in dash lines, which takes place substantially without any spring deflection on the part of the locking rod 4 in case of a sufficiently large pre-stress of the spring 6. From this position the knob 7 can be brought back into its initial position 15 by pulling in the return direction by reason of the rigid arrangement between the abutment 12 and the leg portion 2a of the bellcrank 2. In case of a suddenly occurring impact load on the knob 7, the latter at first displaces itself from its position 15 into the locking position 16. By reason of the yielding arrangement between the locking rod 4 and the bellcrank 2 by way of the pre-stressed spring 6, however, it is now possible that the locking rod 4 can yield further in the axial direction until the upper rim 7a of the actuating knob 7 whose diameter is larger than the interior diameter of the ring 10, abuts at the elastic ring 10 in the position indicated in dash and dot lines. Locking rod 4 thereby slides through the bore 11 of the leg portion 2a by means of the pivot joint between the rod 4 and the bellcrank 2 constructed at the same time as sliding joint. After the elimination of the impact load, the locking rod 4 returns into its locking position 16.

With a plane abutment or support of the coil spring 6 on the top side 13b of the leg portion 2a, a return moment in the return direction would be exerted in the locking position 16 on the arrangement locking rod-bellcrank supported at the pin 5 of the bellcrank 2 and at the ring 10 of the aperture 9 by the inclined position of the bellcrank 2 and the uneven load of the coil spring 6 conditioned thereby over its circumference. In order to avoid this return moment, a corrugation or groove 17 is therefore embossed into the leg portion 2a of the bellcrank 2 in such a manner that at the top side 13b of the leg portion 2a there results a convexly curved surface portion directed toward the coil spring 6 whose apex 18 is disposed perpendicularly to the plane of movement of the bellcrank. As a result of the line-shaped contact achieved thereby between washer or spring 6 and apex 18 of the convexly curved surface, there is assured in each position of the bellcrank 2 an abutment of the spring 6 perpendicular to the axis of the rod 4. Simultaneously therewith, a pressed-in channel results at the bottom side 13a of the leg portion 2a by the embossed corrugation 17, into which engages the abutment 12 in a manner secured against rotation.

According to FIGS. 1–3, the abutment 12 is provided exclusively on the one side of the locking rod end 4a facing the outer wall 19 of the door 1. The abutment 12 is thereby pressed out of the locking rod end 4a in a simple manner as a rectangular or square member, or, according to the illustrated embodiment, in the form of a circular disc. By this arrangement and by the play present between the rod 4 and the bore 11 of the leg portion 2a (FIG. 3), the rod 4 can be tilted in the bore 11 and can be pressed out of the vertical 21 at an inclination. The tilted position of the locking rod 4 made possible thereby is represented in FIG. 2, without window frame, in dash and dot lines. In the assembled condition of the locking rod, the actuating knob 7 abuts constantly against the ring 10 in the lower window frame 8 and thereby approaches closer the window pane 20, depending on the arrangement of the opening 9 above the bellcrank 2.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. An arrangement for securing the locked position of a motor vehicle door-like lock including a locking rod means operatively connected on the inside of the door with a bellcrank, in turn, operatively connected with the lock mechanism, which extends with an actuating knob mounted thereon through an opening provided in a lower window frame of the motor vehicle and which can be brought by pressure in the axial direction into the locking position thereof, characterized by means including pre-stressed spring means for yieldingly connecting the locking rod means in the locking position direction with respect to the bellcrank while connecting said locking rod means rigidly with respect to said bellcrank in the return direction.

2. An arrangement according to claim 1, wherein said actuating knob is made from elastic material.

3. An arrangement according to claim 1, wherein the pre-stress force of the spring means is larger than the pressure force necessary for pressing in the locking rod means into the locking position.

4. An arrangement according to claim 3, wherein said locking rod means extends with play through an aperture of one leg portion of the bellcrank and is provided near its lower end with an abutment means abutting against the bottom side of the leg portion, said locking rod means pivotally connected with said bellcrank, and said spring means constructed as coil spring being clamped between the top side of said leg portion and a shoulder provided at the locking rod means.

5. An arrangement according to claim 4, wherein said one leg portion is provided with a convexly curved surface portion directed toward the spring means, the apex of said surface portion being disposed perpendicularly to the plane of movement of the bellcrank, and the spring means being supported with line contact on said apex.

6. An arrangement according to claim 5, wherein said convexly curved surface portion is constructed as embossed corrugation in said leg portion of the bellcrank, the locking rod means engaging with its abutment means in a channel of said corrugation pressed into the bottom side of the leg portion.

7. An arrangement according to claim 6, wherein the abutment means provided near the lower rod end is arranged unilaterally on the side of the end of the locking rod means facing the outer wall of the vehicle.

8. An arrangement according to claim 7, wherein the abutment means provided unilaterally near the end of the locking rod means is pressed out of the end of the locking rod means in the form of a circular disc.

9. An arrangement according to claim 8, wherein said actuating knob is made from elastic material.

10. An arrangement according to claim 1, wherein said locking rod means extends with play through an aperture of one leg portion of the bellcrank and is provided near its lower end with an abutment means abutting against the bottom side of the leg portion, said locking rod means being pivotally connected with said bellcrank, and said spring means constructed as coil spring being clamped between the top side of said leg portion and a shoulder provided at the locking rod means.

11. An arrangement according to claim 10, wherein said one leg portion is provided with a convexly curved surface portion directed toward the spring means, the apex of said surface portion being disposed perpendicularly to the plane of movement of the bellcrank, and the spring means being supported with line contact on said apex.

12. An arrangement according to claim 11, wherein said convexly curved surface portion is constructed as embossed corrugated in said leg portion of the bellcrank, the locking rod means engaging with its abutment means in a channel of said corrugation pressed into the bottom side of the leg portion.

13. An arrangement according to claim 12, wherein the abutment means provided near the lower rod end is arranged unilaterally on the side of the end of the locking rod means facing the outer wall of the vehicle.

14. An arrangement according to claim 10, wherein the abutment means provided near the lower rod end is arranged unilaterally on the side of the end of the locking rod means facing the outer wall of the vehicle.

15. An arrangement according to claim 14, wherein the abutment means provided unilaterally near the end of the locking rod means is pressed out of the end of the locking rod means in the form of a circular disc.

References Cited
UNITED STATES PATENTS

| | | | |
|---|---|---|---|
| 1,368,041 | 2/1921 | Malone | 292—164 |
| 2,602,662 | 7/1952 | Kintzinger | 74—110X |
| 2,788,235 | 4/1957 | Gilmour | 292—347 |
| 3,455,592 | 7/1969 | Sandor | 292—347 |

MARVIN A. CHAMPION, Primary Examiner

E. J. McCARTHY, Assistant Examiner